No. 720,296. PATENTED FEB. 10, 1903.
F. STRAUB.
HOSE CLAMP.
APPLICATION FILED JUNE 2, 1902.
MODEL.
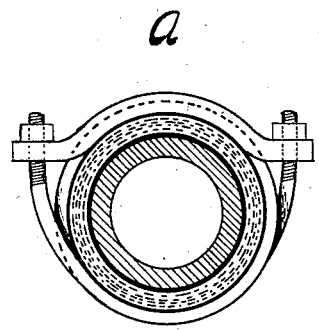
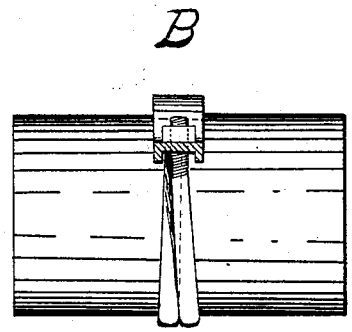
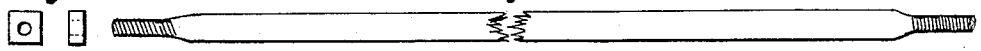
Fig. 2.   Fig. 1
Fig. 3.
Witnesses
Charles N. Pilcher
Clifton C. Griggs
Inventor
Fred Straub

UNITED STATES PATENT OFFICE.

FREDERICK STRAUB, OF FLATIRON, SOUTH DAKOTA.

HOSE-CLAMP.

SPECIFICATION forming part of Letters Patent No. 720,296, dated February 10, 1903.

Application filed June 2, 1902. Serial No. 109,971. (Model.)

*To all whom it may concern:*

Be it known that I, FREDERICK STRAUB, a citizen of the United States, residing at Flatiron, in the county of Lawrence and State of South Dakota, have invented a new and useful Hose-Clamp, of which the following is a specification.

My invention relates to the means by which a hose may be fastened to a pipe or to a coupling so as to connect it to another hose or to any kind of a round tube by which air, steam, or water or any solution may be caused to flow through the hose at any pressure, with the desire that this hose-clamp will hold the hose securely in place, the pipe or tube to be inserted within the hose. I attain this object by means of a simple device illustrated in the accompanying drawings, in which—

Figure 1 is a flexible band, either flat or round, of any kind of metal to be best deemed suitable, threaded upon each end and with a nut, as illustrated in Fig. 2, to fit upon each end, the size and length of this flexible band to be of such a size and length as will fit any particular hose which it is to be used upon. Fig. 3 is a rigid bow-shaped yoke having a groove upon its inner side, through a hole in each end of which it will be desired that the threaded ends of Fig. 1 will pass, and after they are passed through the nuts, as Fig. 2, will screw on, thereby preventing Fig. 1 from being withdrawn. This rigid bow-shaped yoke is to be slightly grooved, so that when it fits over the hose and the loop of Fig. 1, which will be under it, it will conceal that portion of Fig. 1 and present a neat and smooth appearance. The size of this rigid bow-shaped yoke will be to conform with the size of the hose it will be used upon.

The method of operating this device will be to make a complete loop around the hose with Fig. 1, then pass the ends of this through the holes in the ends of the rigid bow-shaped yoke, Fig. 3, this rigid bow-shaped yoke fitting as abovesaid, and then firmly uniting the parts by means of the nuts, Fig. 2, and afterward drawing this clamp to any desired tension by screwing the nuts down. The complete clamp is illustrated in A and B in the drawings.

I am aware that before my invention hose-clamps have been made to pass around the hose and to fasten together by means of one bolt and nut, and I do not claim such a combination; but What I do claim as my invention, and desire to secure by Letters Patent, is—

In a hose-clamp, the combination with a flexible band, of a rigid bow-shaped yoke having a groove upon its inner side, and means for fastening the ends of said band to the opposite ends of said yoke, the band passing entirely around the hose, and through the groove in the yoke, substantially as described.

In testimony whereof I have signed my name to this specification in the presence of two subscribing witnesses.

FRED. STRAUB.

Witnesses:
CHARLES W. PILCHER,
CLIFTON C. GRIGGS.